Figure 1:
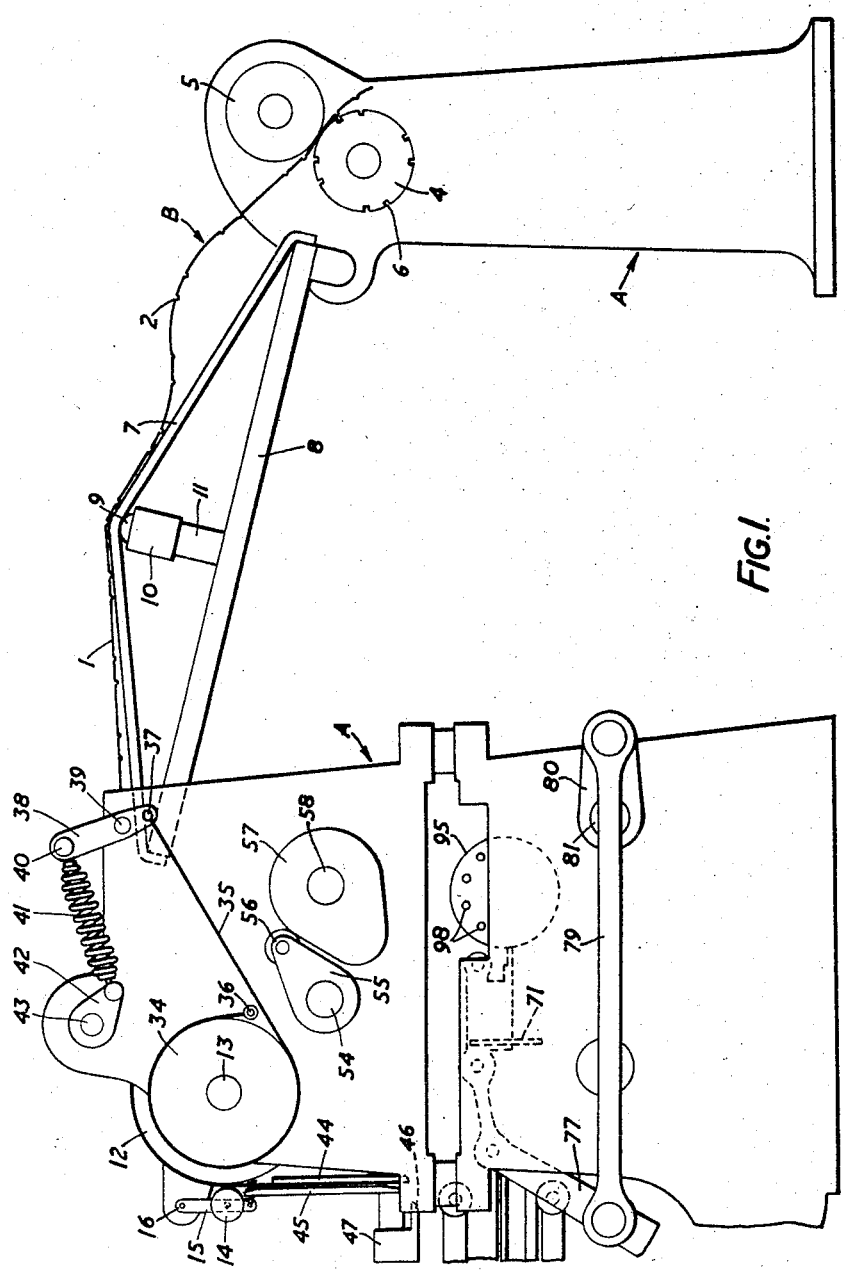

April 14, 1959

E. R. ARMELIN ET AL 2,881,681

METHOD OF AND APPARATUS FOR FORMING
PRISMATIC TUBULAR CARTON SHELLS

Filed Jan. 5, 1956

10 Sheets-Sheet 1

INVENTOR
EDOUARD R. ARMELIN
ARTHUR F. G. PLASKETT
BY Holcombe, Wetherill & Brunelois
ATTORNEYS United States Patent Office 2,881,681
Patented Apr. 14, 1959

2,881,681

METHOD OF AND APPARATUS FOR FORMING PRISMATIC TUBULAR CARTON SHELLS

Edouard Roger Armelin, Ealing, London, and Arthur Frederick George Plaskett, Eastcote, England, assignors to Machines Chambon, Paris, France Application January 5, 1956, Serial No. 557,602

Claims priority, application Great Britain
January 5, 1955

8 Claims. (Cl. 93—49)

This invention relates to apparatus for forming prismatic tubular carton shells from blanks of sheet material having fold lines dividing the blank into panels which are to constitute the sides of the formed shell.

The invention provides apparatus for forming prismatic tubular carton shells from blanks of sheet material having fold lines that divide the blanks into panels which are to constitute the sides of the formed shell, which apparatus comprises plunger means, driving means for reciprocating the plunger means, guide means between which the plunger means forces the blanks in a direction perpendicular to their planes to fold them partially about two fold lines, at least two movable folding members for completing the folding operation to form a flattened tubular shell and mounted so that the operative portion of each movable folding member moves through an arc of a circle of which the centre lies on the axis about which the folding takes place, driving means positively coupled to the first mentioned driving means for driving the movable folding members in timed relation with the operation of the plunger means and means for opening and re-flattening the tubular shells about the hitherto unused fold-lines and subsequently opening and re-flattening the tubular shells about the fold lines first used.

Advantageously, the apparatus also includes an adhesive-applying member that is mounted on the plunger means for applying adhesive to the inner surface of the end portion of each blank that is to overlap the other end portion of the blank after folding, the adhesive-applying member being movable between an adhesive-collecting position and an adhesive-applying position, and driving means coupled to the driving means for the plunger means and operative, during the advance of the plunger means, to move the adhesive-applying member from the adhesive-collecting position to the adhesive-applying position and, during the return of the plunger means to return the adhesive-applying member to the adhesive collecting position.

The invention also provides apparatus for forming prismatic tubular carton shells from blanks of sheet material having fold lines that divide the blanks into panels which are to constitute the sides of the formed shells, which apparatus comprises plunger means, driving means for reciprocating the plunger means, guide means between which the plunger means forces the blanks in a direction perpendicular to their planes to fold them partially about two fold lines, at least two movable folding members for completing the folding operation to form a flattened tubular shell, driving means positively coupled to the first-mentioned driving means for driving the movable folding members in timed relation with the operation of the plunger means, a movable member and a stop member of which the movable member is arranged to engage one folded edge of the flattened tubular shell and the stop member is arranged to engage the other folded edge of the flattened tubular shell so that movement of the movable member opens and partially reflattens the shell about the hitherto unused fold lines, a pair of co-operating rollers arranged to form a nip situated to receive the partially re-flattened tubular shell and to complete the reflattening of the shell, a fixed channel member arranged so that the leading folded edge of the flattened tubular shell is fed by the said rollers into one corner of the channel member, a second movable member arranged to engage the re-flattened tubular shell and move it over the surface of one of the rollers in a direction transverse to the axis of the said roller whereby the shell is opened and partially re-flattened about the fold lines first used and one folded edge of the shell is brought into engagement with the other corner of the channel member, a third roller which co-operates with the said roller to form a nip into which the opposite folded edge of the flattened tubular shell is introduced by the operation of the second movable member, and driving means for the movable members and the rollers.

Figure 2:
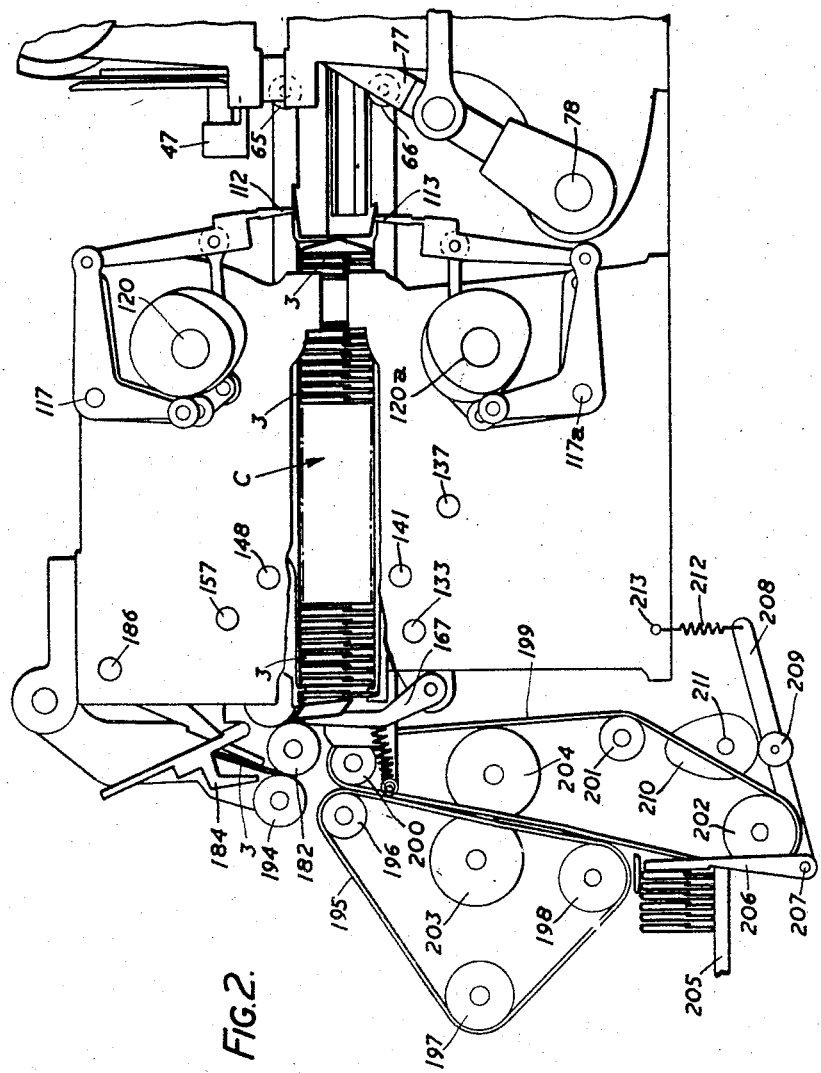
Figure 3:
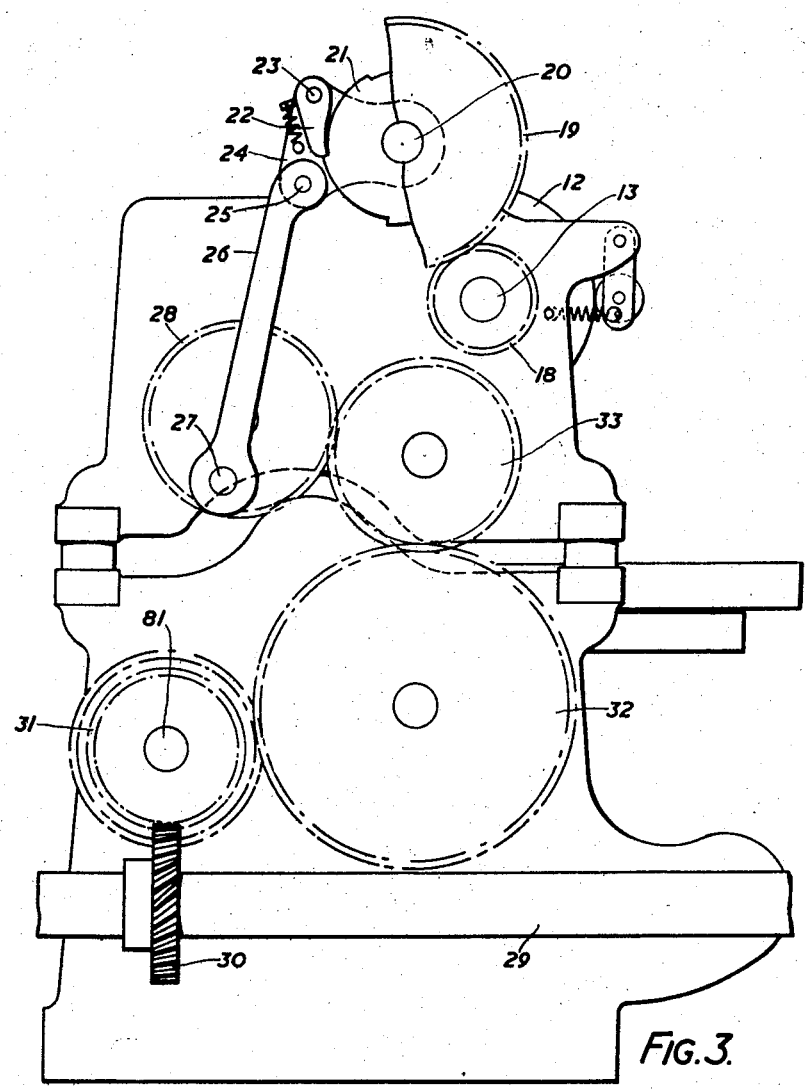
Figure 4:
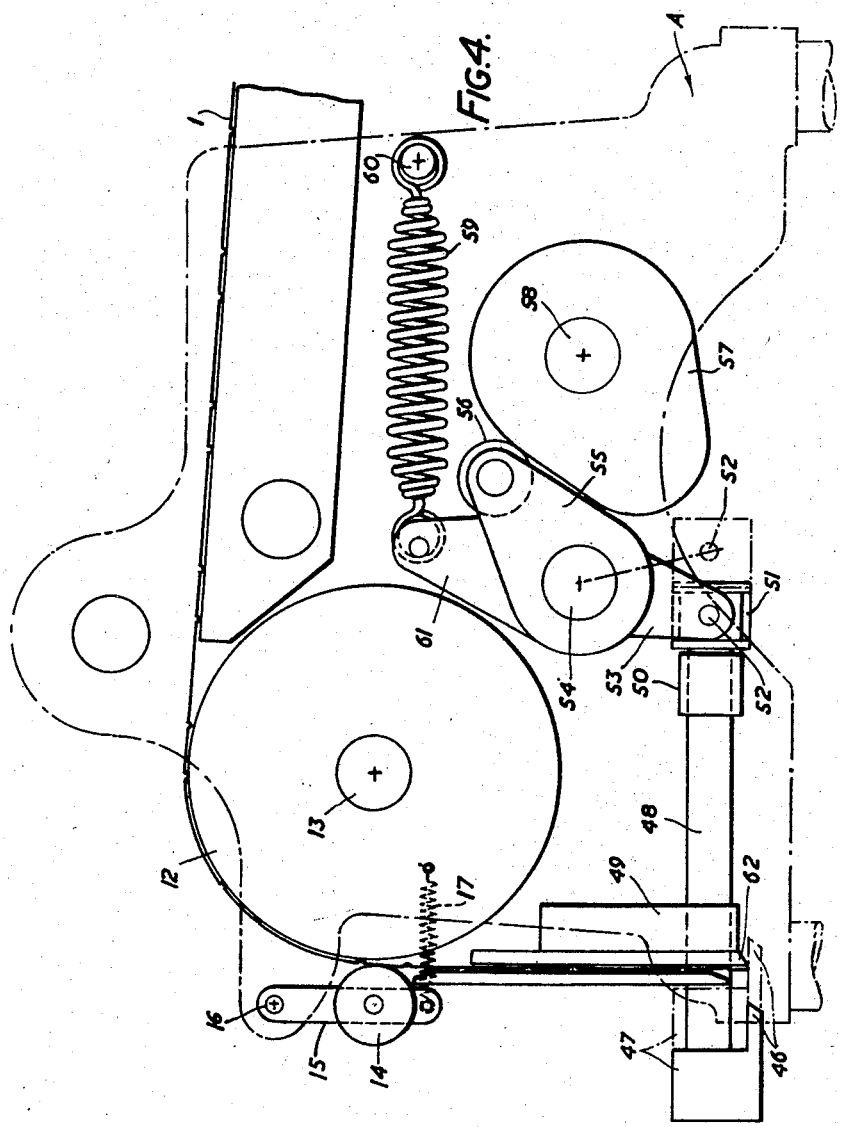
Figure 5:
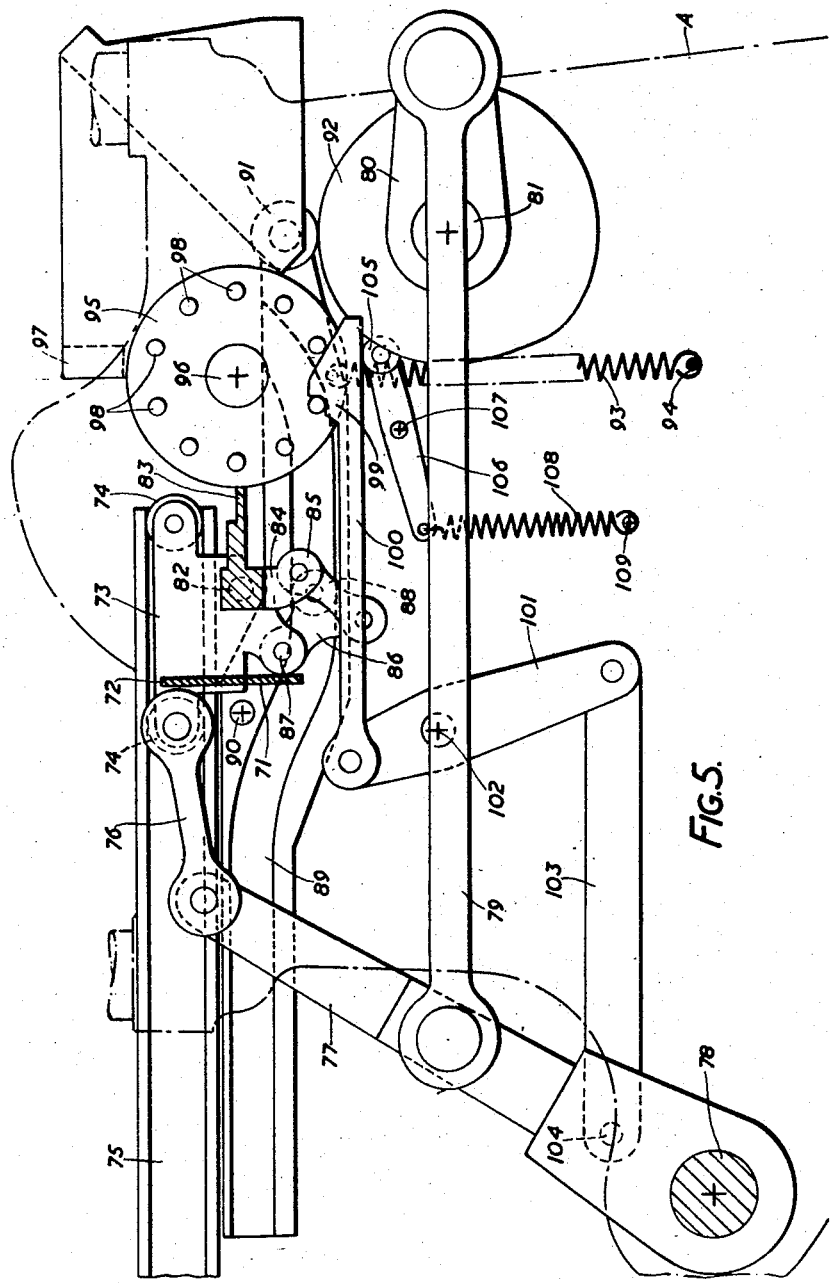
Figure 6:
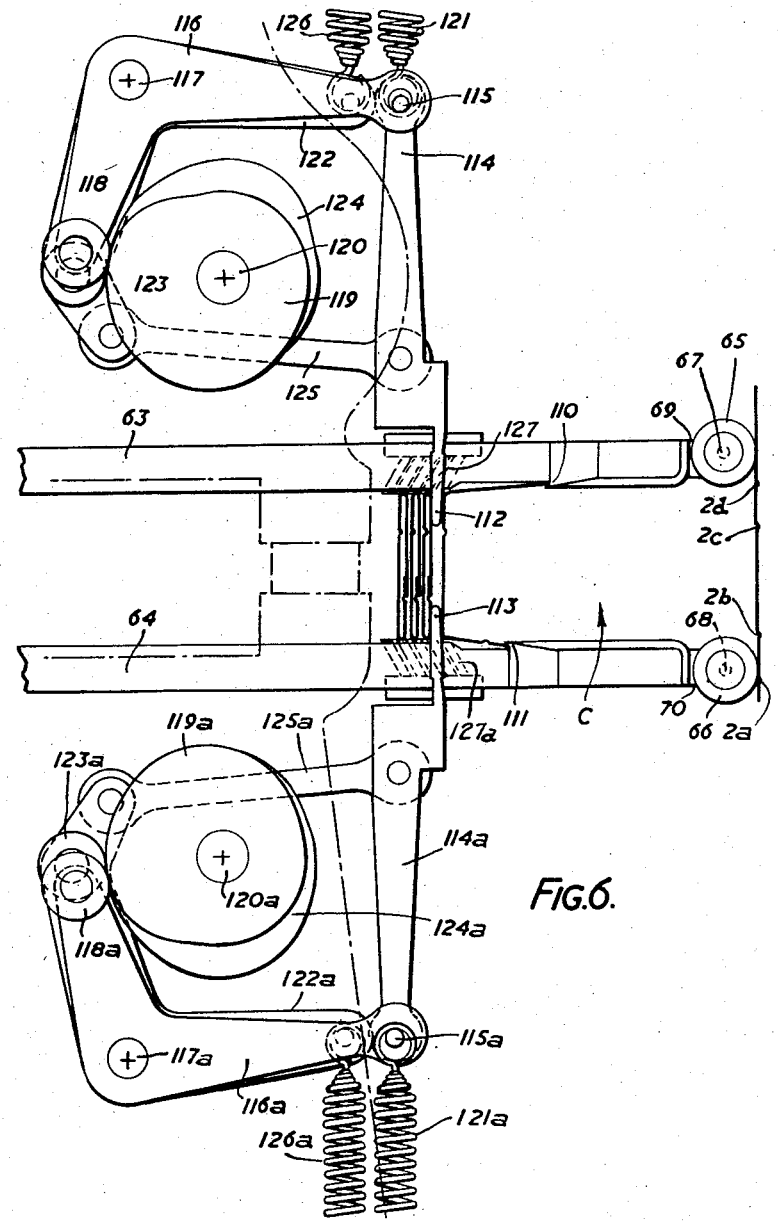
Figure 7:
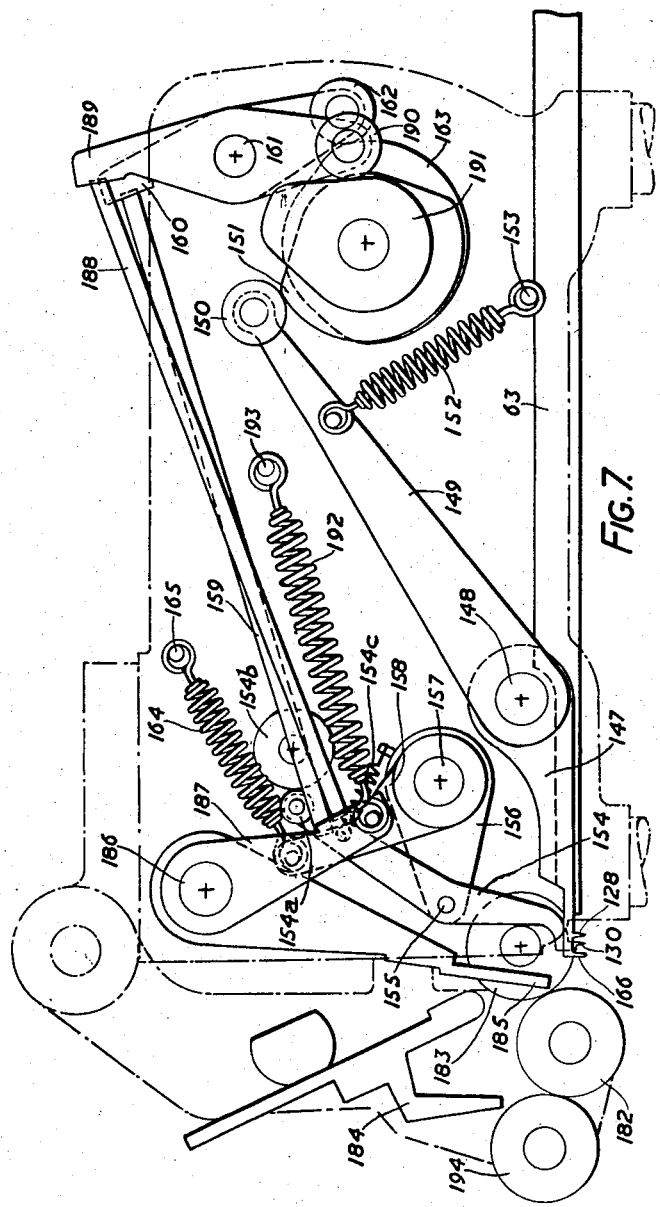
Figure 8:
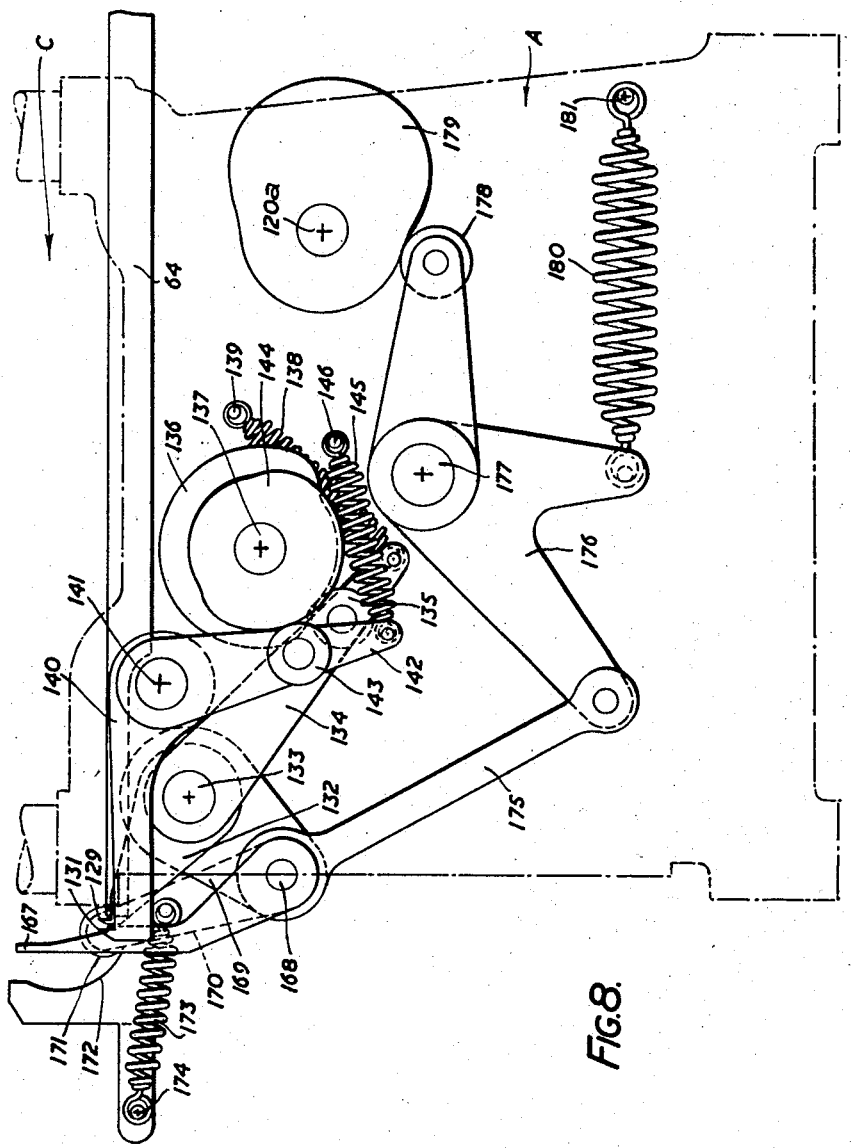
Figure 9:
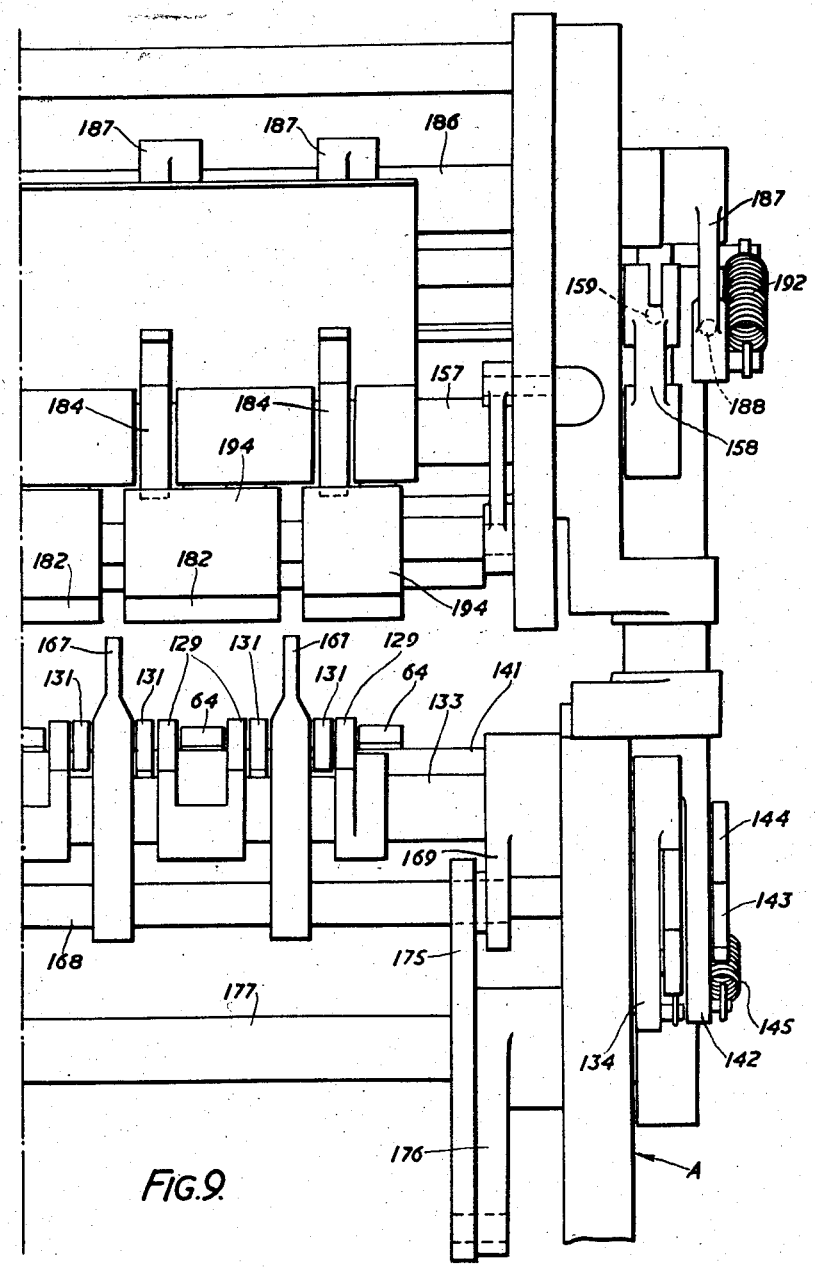
Figure 10:
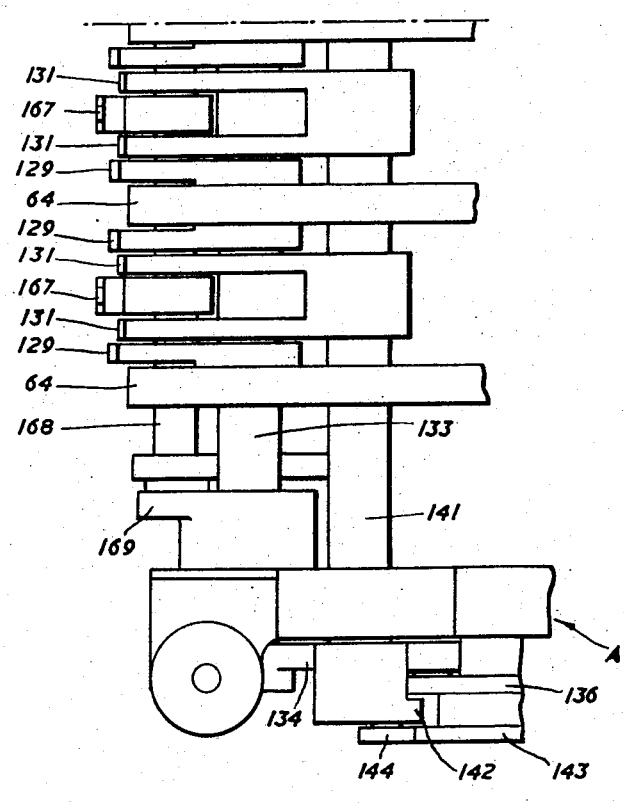

One form of apparatus constructed in accordance with the invention will now be described by way of example in greater detail with reference to the accompanying drawings in which:

Fig. 1 is a side view of the front part of the apparatus;
Fig. 2 is a side view of the rear part of the apparatus;
Fig. 3 is a side elevation of the intermittent feed mechanism seen from the reverse side;
Fig. 4 is a side elevation of the guillotine mechanism;
Fig. 5 is a side elevation of the plunger and gumming mechanism;
Fig. 6 is a side elevation of the folding fingers and the entrance to the guide channel;
Fig. 7 is a side elevation of the upper part of the releasing and refolding mechanism;
Fig. 8 is a side elevation of the lower part of the releasing and refolding mechanism;
Fig. 9 is a half rear elevation of the releasing and refolding mechanism;
Fig. 10 is a plan view of the lower part of the releasing and refolding mechanism shown in Fig. 9.

Referring to Fig. 1 of the drawings, carton material is fed to the front end of the apparatus in the form of a web 1 having fold lines 2 which are formed by creasing and which extend transversely to the web 1. The fold lines 2 are arranged to enable groups of blanks extending across the width of the web 1 and severed from it to be folded to form tubular shells 3 which, when fully open, are of rectangular cross-section. Each group of blanks has four fold lines 2a, 2b, 2c, and 2d.

The web 1 first passes between a pair of continuously rotating feed rollers 4 and 5 mounted in the frame which is denoted generally by A. The lower roller 4 is formed with longitudinal grooves 6 which are arranged to prevent damage to the creased fold lines 2.

The web then passes over a sheet 7 of felt or other resilient material which is secured at each end to a table 8 and which is supported at its centre by a roller 9 which extends transversely to the web 1 and is mounted in a trough 10 secured to the table 8 by pillars 11.

After passing over the resilient sheet 7, the web 1 passes over a roller 12 mounted on a shaft 13 and turns downwardly between the roller 12 and a pressure roller 14 mounted at one end of an arm 15, of which the other end is pivotally mounted on the frame A at 16. Secured to the arm 15 is one end of a spring 17, of which the other end is secured to the frame A and which urges the pressure roller 14 towards the roller 12.

Referring to Fig. 3 of the drawings, there is fixed to the shaft 13 a gear wheel 18 which meshes with a gear wheel 19 which is fixed to a shaft 20. Fixed to the shaft 20 is a ratchet wheel 21 which is engaged by a pawl 22 which is pivotally mounted at 23 on a link 24.

The link 24 is rotatably mounted on the shaft 20, and pivotally connected to the link 24 at 25 is one end of a connecting rod 26, of which the other end is pivotally mounted on a pin 27 which is mounted eccentrically on a gear wheel 28. The gear wheel 28 is driven continuously from a driving shaft 29 via gear wheels 30, 31, 32 and 33.

Rotation of the gear wheel 28 imparts an oscillating motion to the link 24 through the connecting rod 26. The oscillating motion of the link 24 imparts an intermittent motion to the ratchet wheel 21 through the pawl 22 and this intermittent motion is transmitted to the roller 12 via the gear wheels 18 and 19. Thus the web 1 is advanced intermittently by the roller 12 cooperating with the pressure roller 14, the distance through which the web 1 is advanced during each period of movement being exactly equal to the length of a group of blanks. Since the rollers 4 and 5 run continuously, a loop, indicated at B in Fig. 1 is formed between the rollers 4 and 5 and the rollers 12 and 14 when the roller 12 is stationary. When the roller 12 rotates, this loop is pulled taught against the resilient sheet 7 which acts as a cushion.

In order to prevent the roller 12 from overrunning, a band brake is provided. This comprises (see Fig. 1) a wheel 34 fixed on the shaft 13 and a flexible band 35 which runs round the wheel 34 and of which one end is secured to the frame A at 36 and the other end is secured at 37 to one end of a lever 38, which is pivotally mounted on the frame A at 39. Secured to the other end of the lever 38 at 40 is one end of a spring 41, of which the other end is secured to an arm 42 fixed to a shaft 43. The shaft 43 rotates continuously and imparts a varying tension to the band 35 through the arm 42, spring 41 and lever 38. The tension is a minimum at the beginning of each period of rotation of the roller 12 and increases to a maximum at the end of the period.

After passing between the rollers 12 and 14, the web passes between front and rear vertical guide plates 44 and 45 respectively, which are secured to the frame A. Located behind the lower end of the rear guide plate 44 is a moving guillotine 46, carried by a block 47 which is mounted on the rear end of a rod 48 (see Fig. 4). The rod 48 is slidably mounted in a supporting member 49 secured to the front guide plate 44 and in a collar 50 secured to the frame A. The end of the rod 48, remote from the block 47, carries a cage 51 which is engaged by a pin 52 fixed to an arm 53 secured to a shaft 54. Also secured to the shaft 54 is an arm 55, carrying a follower roller 56 which runs on a cam 57 fixed to a shaft 58. The roller 56 is maintained in contact with the cam 57 by means of a spring 59, of which one end is fixed to the frame A at 60 and the other end is secured to an arm 61 which is fixed to the shaft 58. The shaft 54 rotates continuously and so causes the rod 48 to reciprocate. The moving guillotine 46 moves to the position shown in chain lines when the roller 12, and thus the web 1, is stationary and co-operates with a fixed guillotine 62, formed at the lower end of the front guide plate 44, to sever the web 1 along the transverse line. After performing a severing operation, the moving guillotine 46 moves out of the path of web 1 before the next period of rotation of the roller 12 begins.

After passing between the vertical guide plates 44 and 45, the web 1 passes in front of a guide channel, indicated generally at C, and formed by the frame A and a plurality of upper and lower guide bars 63 and 64 respectively, which extend along the length of the channel C and are spaced apart across the apparatus. At the entrance to the channel C are a pair of freely rotatably horizontally extending guide rollers 65 and 66, which are mounted vertically one above the other on shafts 67 and 68 respectively. The upper shaft 67 is journalled in extensions 69 of the upper guide bars 63 and the lower shaft 68 is journalled in extensions 70 of the lower guide bars 64.

The web 1 passes immediately in front of the guide rollers 65 and 66 and is advanced by the rollers 12 and 14 to a position in which the second fold line 2b of the four fold lines 2 in the leading group of blanks is level with the top of the lower guide roller 66 and the last fold line 2d in the group of blanks is level with the bottom of the upper guide roller 65.

When the web 1 has been advanced to this position, the roller 12 reaches the end of a period of rotation and the leading group of blanks is severed from the web 1 by the guillotines 46 and 62. At the same time, the front faces of the group of blanks is struck by the plane vertical face 71 of a reciprocating plunger plate 72 which forces the group of blanks between the guide rollers 65 and 66 into the mouth of the channel C, thereby folding the group of blanks through a right angle about each of the fold lines 2b and 2d.

Referring to Figure 5, the plunger plate 72 is mounted on a carriage 73 in which are journalled rollers 74 which run in a fixed horizontal guide 75. Pivotally connected to the rear end of the carriage 73 is one end of a link 76 of which the other end is pivotally connected to the end of an arm 77 mounted on a shaft 78 which is rotatably journalled in the frame A. Pivotally connected to the arm 77 is one end of a connecting rod 79 of which the other end is pivotally connected to a crank 80 fixed to the shaft 81 which carries the gear wheel 31 (see Figure 3).

Mounted on the carriage 73 by means of a pivot 82 is a gumming blade 83 to which there is fixed an arm 84. Pivotally connected to the arm 84 is one end of a link 85 of which the other end is pivotally connected to a link 86. The link 86 is pivotally connected to the carriage 73 at 87 and carries a follower roller 88. The follower roller 88 runs in a curved guide 89 which is pivotally mounted in the frame A at 90. Rotatably mounted in the rear end of the guide 89 is a follower roller 91 which runs on a cam 92 fixed on the shaft 81. Contact between the follower roller 91 and the cam 92 is maintained by means of the spring 93 which is secured to the frame A at 94.

When the carriage 73 is in its forwardmost position, as shown in Figure 5, the gumming blade 83 lies in a horizontal position and the tip of the blade touches the surface of a gumming roller 95 which is mounted on a shaft 96 which is journalled in the frame A. The gumming roller 95 forms part of a trough 97 which contains a liquid adhesive. Projecting axially from one end of the gumming roller 95 are a number of studs 98 which are engaged by a ratchet 99. The ratchet 99 is formed at one end of a lever 100 of which the other end is pivotally connected to the upper end of a link 101. The link 101 is pivotally mounted in the frame A at 102 and the lower end of the link 101 is pivotally connected to one end of a connecting rod 103 of which the other end is pivotally connected to the arm 77 at 104. The ratchet 99 is urged upwardly by a roller 105 which is rotatably mounted at one end of a lever 106 which is mounted on a pivot 107 fixed in the frame A. The other end of the lever 106 is urged downwardly by a spring 108 which is secured to the frame A at 109.

The plunger and gumming mechanism operates in the following way. The rotation of the shaft 81 imparts an oscillatory movement to the arm 77 via the crank 80 and the connecting rod 79. This causes the carriage 73 to reciprocate, the rollers 74 running in the fixed guide 75. As the carriage 73 advances from the position shown in Figure 5, the follower roller 88 runs up the guide 89 and so causes the link 86 to pivot upwardly about the pivot 87. This causes the link 85 to rise and so turns the arm 84 about the pivot 82. Thus the gumming blade rises until it assumes a vertical position. When the vertical face 71 of the plunger plate 72 forces the severed group of blanks between the upper and lower guide rollers 65 and 66 respectively, the upper end of the severed group of blanks is folded downwardly until it meets the tip of the gumming blade 83, which deposits a line of adhesive extending across the group of blanks.

Just before the plunger plate 72 starts its return stroke, the follower roller 91 comes on to the high part of the cam 92 and so causes the guide 89 to turn about the pivot 90 so that the front end of the guide 89 is lowered. This pulls the follower roller 88 downwardly and so causes the gumming blade 83 to pivot downwardly and rearwardly. This movement, together with the horizontal movement of the carriage 73 at the start of its return stroke, causes the tip of the gumming blade 83 to be stripped rapidly from the carton material and so prevents the adhesive from adhering to the blade 83. The plunger plate 72 and gumming blade 83 then return to the position shown in Figure 5. In the meantime the gumming roller 95 has been rotated by an amount equal to the distance between adjacent studs 98 by the ratchet 99 actuated by the link 101 and connecting rod 103 from the arm 77.

When the plunger 72 starts its return stroke, the severed group of blanks is prevented from returning with it by upper and lower retaining catches 110 and 111 respectively which are secured to the upper and lower guide bars 63 and 64 respectively and behind which the upper and lower ends of the severed group of blanks spring owing to the tendency of the blanks to unfold again.

After the plunger 72 has withdrawn, the folding operation is completed by upper and lower folding fingers 112 and 113 respectively which pass between the upper guide bars 63 and the lower guide bars 64.

The upper folding fingers 112 are formed at the lower end of an arm 114. The upper end of the arm 114 is pivotally connected at 115 to one end of a bell-crank lever 116 which is pivotally mounted in the frame A at 117. The other end of the bell-crank lever 116 carries a follower roller 118 which runs on a cam 119 fixed to a cam shaft 120. The follower roller 118 is maintained in contact with the cam 119 by means of a spring 121 which is connected to the bell-crank lever 118 at 115. Also mounted on the pivot 117 is a bell-crank lever 122 which carries a follower roller 123 which runs on a cam 124 fixed to the cam shaft 120. Pivotally connected to one end of the bell-crank lever 122 is one end of a link 125 of which the other end is pivotally connected to the arm 114. Attached to the other end of the bell-crank lever 122 is a spring 126 which maintains the follower roller 123 in contact with the cam 124.

The lower folding fingers 113 are formed at the upper end of an arm 114a. The lower end of the arm 114a is pivotally connected at 115a to one end of a bell-crank lever 116a which is pivotally mounted in the frame A at 117a. The other end of the bell-crank lever 116a carries a follower roller 118a which runs on a cam 119a fixed to a cam shaft 120a. The follower roller 118a is maintained in contact with the cam 119a by means of a spring 121a which is connected to the bell-crank lever 118a at 115a. Also mounted on the pivot 117a is a bell-crank lever 122a which carries a follower roller 123a which runs on a cam 124a fixed to the cam shaft 120a. Pivotally connected to one end of the bell-crank lever 122a is one end of a link 125a of which the other end is pivotally connected to the arm 114a. Attached to the other end of the bell-crank lever 122a is a spring 126a which maintains the follower roller 123a in contact with the cam 124a.

The cam shafts 120 and 120a rotate continuously in timed relation with movement of the plunger plate 72 and cause the folding fingers 112 and 113 to move between the position shown in Figure 2 and the position shown in Figure 6 in which the fingers have just completed the folding movement by reason of the relative settings of the cams 119 and 119a, and 124 and 124a, the lower folding fingers 113 perform the folding movement just before the upper folding fingers 112 do so. This ensures that the upper end portion of the group of blanks is folded over the lower end portion and not vice versa. Thus the adhesive applied by the gumming blade 83 seals the group of blanks into a tubular shell 3.

Pads of plush 127 and 127a are mounted respectively on the upper and lower guide bars 63 and 64 in the region of operation of the folding fingers 112 and 113.

The folded and sealed tubular shells 3 form a stack along the guide channel C and are slowly advanced by the pressure of further shells 3 introduced by successive strokes of the plunger plate 72. As the tubular shells 3 pass along the guide channel C the adhesive dries so that it has set completely by the time that the tubular shells 3 reach the front end of the guide channel C.

The release of the tubular shells 3 from the front end of the guide channel C is controlled by upper and lower sets of inner blades 128 and 129 respectively and upper and lower sets of outer blades 130 and 131 respectively.

The arrangement of the lower sets of blades 129 and 131 and the mechanism which operates them is shown in Figs. 8, 9 and 10. The inner blades 129 are carried on U-shaped arms 132 fixed to a shaft 133. Also fixed to the shaft 133 is an arm 134 which carries a follower roller 135 which runs on a cam 136 fixed on the shaft 137. A spring 138, which is secured to the frame A at 139, maintains the follower roller 135 in contact with the cam 136. The outer blades 131 are carried on U-shaped arms 140 between the limbs of which there pass the lower guide bars 64. The U-shaped arms 140 are fixed to a shaft 141 to which there is also fixed an arm 142. The arm 142 carries a follower roller 143 which runs on a cam 144, which is fixed to the shaft 137. A spring 145, which is secured to the frame A at 146, maintains the follower roller 143 in contact with the cam 144.

The upper sets of blades 128 and 130 and the mechanism which operates them are shown in Fig. 7. The inner blades 128 are carried on U-shaped arms 147 which are fixed to the shaft 148. Also fixed to the shaft 148 is an arm 149 which carries a follower roller 150. The follower roller 150 runs on a cam 151 fixed to the cam shaft 120, and a spring 152, which is secured to the frame A at 153, maintains the follower roller 150 in contact with the cam 151. The outer blades 130 are carried on levers 154 which are mounted at 155 on arms 156 fixed to a shaft 157. The levers 154 carry rollers 154a which run on a fixed shaft 154b. The rollers 154a are maintained in contact with the shaft 154b by means of a spring 154c. Also fixed to the shaft 157 is an arm 158 from which a push rod 159 runs to a rocker arm 160, which is rotatably mounted on a shaft 161. The rocker arm 160 carries a follower roller 162 which runs on a cam 163, fixed to the cam shaft 120. A spring 164, which is secured at one end to the frame A at 165 and at the other end to the arm 158, maintains the follower roller 162 in contact with the cam 163.

The cam shafts 120 and 137 rotate continuously and cause the inner sets of blades 128 and 129, which are situated in the same vertical plane, to move to and fro between the position shown in Figs. 7 and 8, in which they project into the channel C and engage the tubular shells 3, and a position in which they are withdrawn to release the tubular shells 3. Similarly, the outer sets of blades 130 and 131, which are also situated in the same vertical plane, are caused to move to and fro between the position shown in Figs. 7 and 8, in which they project into the channel C and engage the tubular shells 3, and a position in which they are withdrawn to release the shells 3.

The blades release the tubular shells 3 singly in the following way. Each tubular shell 3 is engaged first by the inner sets of blades 128 and 129. These then withdraw and the tubular shell 3 advances under the pressure exerted by the stack of shells 3 which follow, until it meets the outer sets of blades 130 and 131. The inner sets of blades 128 and 129 then return to engage the next following tubular shell 3 while the outer sets of blades withdraw to release the leading tubular shell 3. The outer sets of blades 130 and 131 return to their engaging position in time to engage the next following tubular shell 3 after it has been released by the inner sets of blades 128 and 129.

When the leading tubular shell 3 is released, it springs open slightly and its upper edge is engaged by a set of blades 166, which are carried by the arms 147 and which are situated in front of the outer set of blades 130.

The lower edge of the released tubular shell 3 is engaged by a set of stepped fingers 167, which are fixed to a shaft 168 which is rotatably mounted in a radius arm 169 rotatably mounted on the shaft 133. Also fixed to the shaft 168 is an arm 170 which carries a follower roller 171 which runs on a curved guide 172. The follower roller 171 is maintained in contact with the curved guide 172 by a spring 173 which is secured to the frame A at 174. Rotatably mounted on the shaft 168 is a link 175 of which the other end is pivotally connected to one limb of a double arm 176, which is fixed to a shaft 177. Also fixed to the shaft 177 is a follower roller 178 which runs on a cam 179 fixed on the cam shaft 120a. The follower roller 178 is maintained in contact with the cam 179 by means of a spring 180, which is secured to the frame A at 181.

The cam shaft 120a rotates continuously and causes the stepped fingers 167 to move up and down. When the leading tubular shell 3 of the stack is released by the outer sets of blades 130 and 131, the stepped fingers 167 engage the lower edge of the tubular shell 3 and force it upwardly. Since the upper edge of the tubular shell 3 is held by the blades 166, this causes the tubular shell 3 to open and be partially re-flattened by folding about the fold lines 2a and 2c. The upper edge of the tubular shell 3 is then released by the blades 166 (which are withdrawn when the inner blades 128 are next withdrawn) and the partially re-flattened tubular shell 3 is carried upwardly (see Fig. 2) and enters the nips between two sets of continuously driven rollers 182 and 183 which complete the re-flattening process.

After emerging from between the sets of rollers 182 and 183, the upper edge of the tubular shell 3 meets an inverted slotted trough 184 which is secured to the frame A. The lower edge of the tubular shell 3 is then forced forwards by a set of oscillating arms 185 which pass through the slots in the trough 184 and between the rollers of the sets 182 and 183.

The oscillating arms 185 are fixed on a shaft 186. Also fixed to the shaft 186 is an arm 187 from which a push rod 188 runs to a rocker arm 189, pivotally mounted on the shaft 161. The rocker arm carries a follower roller 190, which runs on a cam 191 fixed to the cam shaft 120. The follower roller 190 is maintained in contact with the cam 191 by means of a spring 192, of which one end is secured to the arm 187 and the other end is secured to the frame A at 193. The cam shaft 120 runs continuously and causes the oscillating arms 185 to oscillate backwards and forwards.

Since the height between the top of the roller 182 and the base of the inverted trough 184 is less than the height of a flattened tubular shell 3, the forward movement of the oscillating arms 185 causes the tubular shell 3 to open and be re-flattened by folding about the fold lines 2b and 2d. The re-flattened shell 3 then enters the nip between the set of rollers 182 and a set of rollers 194 (see Fig. 2), and the re-flattening is completed. This reverse folding operation is carried out so that, when the flattened tubular shell 3 is subsequently released in a carton-filling machine, it shall open squarely.

The re-flattened tubular shell 3 passes downwardly between the sets of rollers 182 and 194 and is fed between a split endless belt 195 which runs on rollers 196, 197 and 198, and a split endless belt 199 which runs on rollers 200, 201 and 202. Continuously rotating circular knives 203 and 204 divide the tubular shells 3 into individual carton shells during their passage between the opposed runs of the split endless belts 195 and 199.

On emerging from between the split endless belts 195 and 199, the carton shells are stacked on a table 205 by means of oscillating stacker arms 206. The stacker arms 206 are fixed to a shaft 207 to which there is also fixed an arm 208 which carries a follower roller 209. The follower roller 209 runs on a cam 210 mounted on a shaft 211 and is maintained in contact with the cam 210 by means of a spring 212 which is secured to the frame A at 213.

It will be understood that while the apparatus described is for use with carton material in which fold lines have been made by creasing, it is equally applicable to use with carton material in which the fold lines have been made by scoring; the slots 6 in the roller 4 being then unnecessary.

We claim:

1. Apparatus for forming prismatic tubular carton shells from blanks of sheet material having fold lines that divide the blanks into panels which are to constitute the sides of the formed shell, which apparatus comprises plunger means, driving means for reciprocating the plunger means, guide means between which the plunger means forces the blanks in a direction perpendicular to their planes to fold them partially about two fold lines, at least two movable folding members for completing the folding operation to form a flattened tubular shell and mounted so that the operative portion of each movable folding member moves through an arc of a circle of which the centre lies on the axis about which the folding takes place, driving means positively coupled to the first mentioned driving means for driving the movable folding members in timed relation with the operation of the plunger means and means for opening and re-flattening the tubular shells about the hitherto unused foldlines and subsequently opening and re-flattening the tubular shells about the fold lines first used.

2. Apparatus as claimed in claim 1, wherein each movable folding member consists of a plurality of collateral fingers and an arm connected to and extending away from the said fingers, and the driving means for each movable folding member comprises a pivotally mounted lever which is pivotally connected to the arm at a point away from the fingers, a second lever pivotally mounted co-axially with the first-mentioned lever, a link of which one end is pivotally connected to the second lever and the other end is pivotally connected to the arm at a point towards the fingers, a pair of cams fixed on a rotatable shaft, and two follower rollers mounted one on each of the levers and running on the cams so that rotation of the cams rocks the levers and causes the tip of the fingers, which bear against the blanks during folding to move to and fro through the said arc.

3. Apparatus for forming prismatic tubular carton shells from blanks of sheet material having fold lines that divide the blanks into panels which are to constitute the sides of the formed shells, which apparatus comprises plunger means, driving means for reciprocating the plunger means, guide means between which the plunger means forces the blanks in a direction perpendicular to their planes to fold them partially about two fold lines, at least two movable folding members for completing the folding operation to form a flattened tubular shell, driving means positively coupled to the first-mentioned driving means for driving the movable folding members in timed relation with the operation of the plunger means, a movable member and a stop member of which the movable member is arranged to engage one folded edge of the flattened tubular shell and the stop member is arranged to engage the other folded edge of the flattened tubular shell so that movement of the movable member opens and partially reflattens the shell about the hitherto unused fold lines, a pair of co-operating rollers arranged to form a nip situated to receive the partially re-flattened tubular shell and to complete the reflattening of the shell, a fixed channel member arranged so that the leading folded edge of the flattened tubular shell is fed by the said rollers into one corner of the channel member, a second movable member arranged to engage the re-flattened tubular shell and move it over the surface of one of the rollers in a direction transverse to the axis of the said roller whereby the shell is opened and partially re-flattened about the fold lines first used and one folded edge of the shell is brought into engagement with the other corner of the channer member, a third roller which co-operates with the said roller to form a nip into which the opposite folded edge of the flattened tubular shell is introduced by the operation of the second movable member, and driving means for the movable members and the rollers.

4. Apparatus as claimed in claim 3, which includes guide means extending from the movable folding members to the first movable member and the stop member for the transfer of the flattened tubular shells in a stack under the action of the movable folding members, and an adhesive-applying member mounted on the plunger means for applying adhesive to the inner surface of the end portion of each blank that is to overlap the other end portion of the blank after folding.

5. Apparatus as claimed in claim 3, which includes guide means extending from the movable folding members to the first movable member and the stop member for the transfer of the flattened tubular shells under the action of the movable folding members, an inner pair of retaining members and an outer pair of retaining members each movable between a position in which they retain the flattened tubular shells within the guide means and a withdrawn position in which they release the shells, and cam means for operating the said inner and outer retaining members in alternating relation to release the flattened tubular shells singly from the stack for engagement by the first movable member and the stop member.

6. Apparatus for forming prismatic tubular carton shells from blanks of sheet material having fold lines that divide the blanks into panels which are to constitute the sides of the formed shell, which apparatus comprises plunger means, driving means for reciprocating the plunger means, guide means between which the plunger means forces the blanks in a direction perpendicular to their planes to fold them partially about two fold lines, at least two movable folding members for completing the folding operation to form a flattened tubular shell and mounted so that the operative portion of each movable folding member moves through an arc of a circle of which the centre lies on the axis about which the folding takes place, driving means for driving the movable folding members in timed relation with the operation of the plunger means, an adhesive-applying member that is mounted on the plunger means for applying adhesive to the inner surface of the end portion of each blank that is to overlap the other end portion of the blank after folding, the adhesive-applying member being movable between an adhesive-collecting position and an adhesive-applying position, driving means coupled to the driving means for the plunger means and operative, during the advance of the plunger means, to move the adhesive-applying member from the adhesive-collecting position to the adhesive-applying position and, during the return of the plunger means, to return the adhesive-applying member to the adhesive-collecting position, and means for opening and re-flattening the tubular shells about the hitherto unused fold lines and subsequently opening and re-flattening the tubular shells about the fold lines first used.

7. Apparatus for forming prismatic tubular carton shells from blanks of sheet material having fold lines that divide the blanks into panels which are to constitute the sides of the formed shell, which apparatus comprises plunger means, driving means for reciprocating the plunger means, guide means between which the plunger means forces the blanks in a direction perpendicular to their planes to fold them partially about two fold lines, at least two movable folding members for completing the folding operation to form a flattened tubular shell and mounted so that the operative portion of each movable folding member moves through an arc of a circle of which the centre lies on the axis about which the folding takes place, driving means for driving the movable folding members in timed relation with the operation of the plunger means, an adhesive-applying blade that is mounted on the plunger means for applying adhesive to the inner surface of the end portion of each blank that is to overlap the other end portion of the blank after folding, the blade being pivotally mounted for movement between an adhesive-collecting position in which it extends in the direction of travel of the plunger means and an adhesive-applying position in which it extends in a direction transverse to the direction of travel of the plunger means, cam means operative, during the advance of the plunger means, to move the blade from the adhesive-collecting position to the adhesive-applying position and, during the return of the plunger means, to return the blade to the adhesive-collecting position, and means for opening and re-flattening the tubular shells about the hitherto unused fold lines and subsequently opening and re-flattening the tubular shells about the fold lines first used.

8. Apparatus for forming prismatic tubular carton shells from blanks of sheet material having fold lines that divide the blanks into panels which are to constitute the sides of the formed shell, which apparatus comprises plunger means, driving means for reciprocating the plunger means, guide means between which the plunger means forces the blanks in a direction perpendicular to their planes to fold them partially about two fold lines, at least two movable folding members for completing the folding operation to form a flattened tubular shell and mounted so that the operative portion of each movable folding member moves through an arc of a circle of which the centre lies on the axis about which the folding takes place, driving means for driving the movable folding members in timed relation with the operation of the plunger means, an adhesive-applying blade that is mounted on the plunger means for applying adhesive to the inner surface of the end portion of each blank that is to overlap the other end portion of the blank after folding, which blade is pivotally mounted on the plunger means for movement between an adhesive-collecting position in which it extends in the direction of travel of the plunger means and an adhesive-applying position in which it extends in a direction transverse to the direction of travel of the plunger means, cam means operative, during the advance of the plunger means, to move the blade from the adhesive-collecting position to the adhesive-applying position and, during the return of the plunger means, to return the blade to the adhesive-collecting position, additional cam means arranged to operate at the beginning of the return stroke of the plunger means to move the blade rapidly out of the adhesive-applying position so that the blade is stripped rapidly from the carton material, and means for opening and re-flattening the tubular shells about the hitherto unused fold lines and subsequently opening and re-flattening the tubular shells about the fold lines first used.

References Cited in the file of this patent

UNITED STATES PATENTS

| | | |
|---|---|---|
| 624,754 | Corkhill | May 9, 1899 |
| 980,609 | Cowles | Jan. 3, 1911 |
| 1,020,821 | Hesser | Mar. 19, 1912 |
| 1,277,252 | Paridon | Aug. 27, 1918 |
| 2,241,817 | Howard | May 13, 1941 |
| 2,574,527 | Bowersock | Nov. 13, 1951 |